(12) United States Patent
Sjöö et al.

(10) Patent No.: US 7,409,896 B2
(45) Date of Patent: Aug. 12, 2008

(54) TOOL FOR CHIP REMOVING MACHING

(75) Inventors: Sture Sjöö, Gävle (SE); Ronnie Sikström, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

(21) Appl. No.: 11/289,625

(22) Filed: Nov. 30, 2005

(65) Prior Publication Data
US 2006/0162511 A1 Jul. 27, 2006

(30) Foreign Application Priority Data
Dec. 2, 2004 (SE) .................... 0402927

(51) Int. Cl.
*B23B 29/00* (2006.01)
*B26D 1/12* (2006.01)

(52) U.S. Cl. .................. 82/158; 407/66; 407/30; 407/33; 407/35; 407/67

(58) Field of Classification Search ............... 82/158; 407/42, 66, 67, 30, 33, 35
See application file for complete search history.

(56) References Cited

U.S. PATENT DOCUMENTS 5,931,616 A * 8/1999 Daub .................. 409/132
5,944,456 A * 8/1999 Shirley et al. ............. 407/42
5,984,592 A * 11/1999 Harper et al. .............. 407/40
6,220,795 B1 * 4/2001 Matthews ................. 408/1 R
6,948,891 B2 * 9/2005 Roman ..................... 408/223
7,004,689 B2 * 2/2006 DeRoche et al. .......... 407/48

FOREIGN PATENT DOCUMENTS

| DE | 3733298 C2 | 4/1989 |
| EP | 1186367 A1 | 3/2002 |
| WO | 2004/069455 A1 | 8/2004 |

* cited by examiner

Primary Examiner—Willmon Fridie
(74) Attorney, Agent, or Firm—Drinker Biddle & Reath LLP (57) ABSTRACT

A tool for chip removing machining comprising a tool head, which is provided with insert seats for the receipt of replaceable cutting inserts as well as a fastening part intended to be received in a machine tool. The tool has at least two chip pockets, in each one of which two replaceable cutting inserts are arranged, the two cutting inserts arranged in each chip pocket being intended for different types of machining and having the active surfaces thereof opposite each other. Furthermore, the two cutting inserts arranged in a common chip pocket have their axially furthermost portions located at different levels in the axial direction of the tool. The two cutting inserts for turning are located in different chip pockets and have their axially furthermost portions thereof located at different levels in the axial direction.

14 Claims, 12 Drawing Sheets

Fig. 12 ific Patent Application No. 0402927-8
TOOL FOR CHIP REMOVING MACHING

CROSS REFERENCE TO RELATED APPLICATION

This application claims priority under 35 U.S.C. §§119(a)-(d) and/or 365 to Swedish Patent Application No. 0402927-8 filed Dec. 2, 2004.

BACKGROUND OF THE INVENTION

The present invention relates to a tool for chip removing machining, comprising a tool head, which is provided with insert seats for the receipt of replaceable cutting inserts as well as a fastening part, which is intended to be received in a machine tool, and having at least two chip pockets, in which two replaceable cutting inserts are arranged. The cutting inserts are intended for different types of machining and have active surfaces thereof opposite each other. Two cutting inserts arranged in a chip pocket have axially foremost portions thereof situated at different levels in the axial direction. The tool according to the present invention is preferably intended for machining of metal.

DE 37 33 298 C2 discloses a combination tool for chip removing machining, which, according to one embodiment, has two indexable inserts in the same chip pocket, the cutting inserts being spaced-apart in the circumferential direction of the tool. One of the cutting inserts is a center cutting insert and the other one is a peripheral cutting insert. By means of the combination tool, different types of chip removing machining can be carried out, for instance turning, milling and drilling.

EP 1 186 367 A1 discloses a tool by means of which turning and milling can be carried out. There is no clear division of which type of machining the cutting inserts of the tool should carry out. For instance, the same cutting inserts are used both for milling and for turning. Furthermore, both of the cutting inserts arranged in a chip pocket are used for turning.

WO 2004/069455 A1 discloses a tool for chip removing machining, which comprises a tool head, which is provided with insert seats for receiving replaceable cutting inserts. The tool head has at least one chip pocket, in which two replaceable cutting inserts are arranged, the cutting inserts being intended for different types of machining and having the active surfaces thereof opposite each other. The cutting inserts included in one and the same chip pocket are of different types, more precisely, one of the cutting inserts is intended for rotary machining while the other one is intended for turning.

SUMMARY OF THE INVENTION

A primary object of the present invention is to provide a tool for chip removing machining where the cutting inserts are arranged in such a way that they should not interfere with each other when different types of machining are carried out.

Another object of the present invention is that the tool should be exceptionally simple to use by the fact that standard settings of the tool in relation to the workpiece apply to most working operations.

Still another object of the present invention is that the tool should be provided with cutting inserts of standard design.

According to an aspect of the present invention, a tool for chip removing machining, comprises a tool head including insert seats for receipt of replaceable cutting inserts. A fastening part is received in a machine tool. At least two chip pockets are provided, each of the chip pockets including cutting inserts intended for different types of machining and having active surfaces thereof opposite each other. The cutting inserts are arranged in a common chip pocket and have axially furthermost portions located at different levels in an axial direction of the tool. The cutting inserts for turning being located in different chip pockets and have axially furthermost portions located at different levels in the axial direction of the tool.

BRIEF DESCRIPTION OF THE DRAWING

Below, an embodiment of the invention will be described, reference being made to the accompanying drawings, where.

DETAILED DESCRIPTION OF THE PREFERRED EMBODIMENTS

Figure 1:
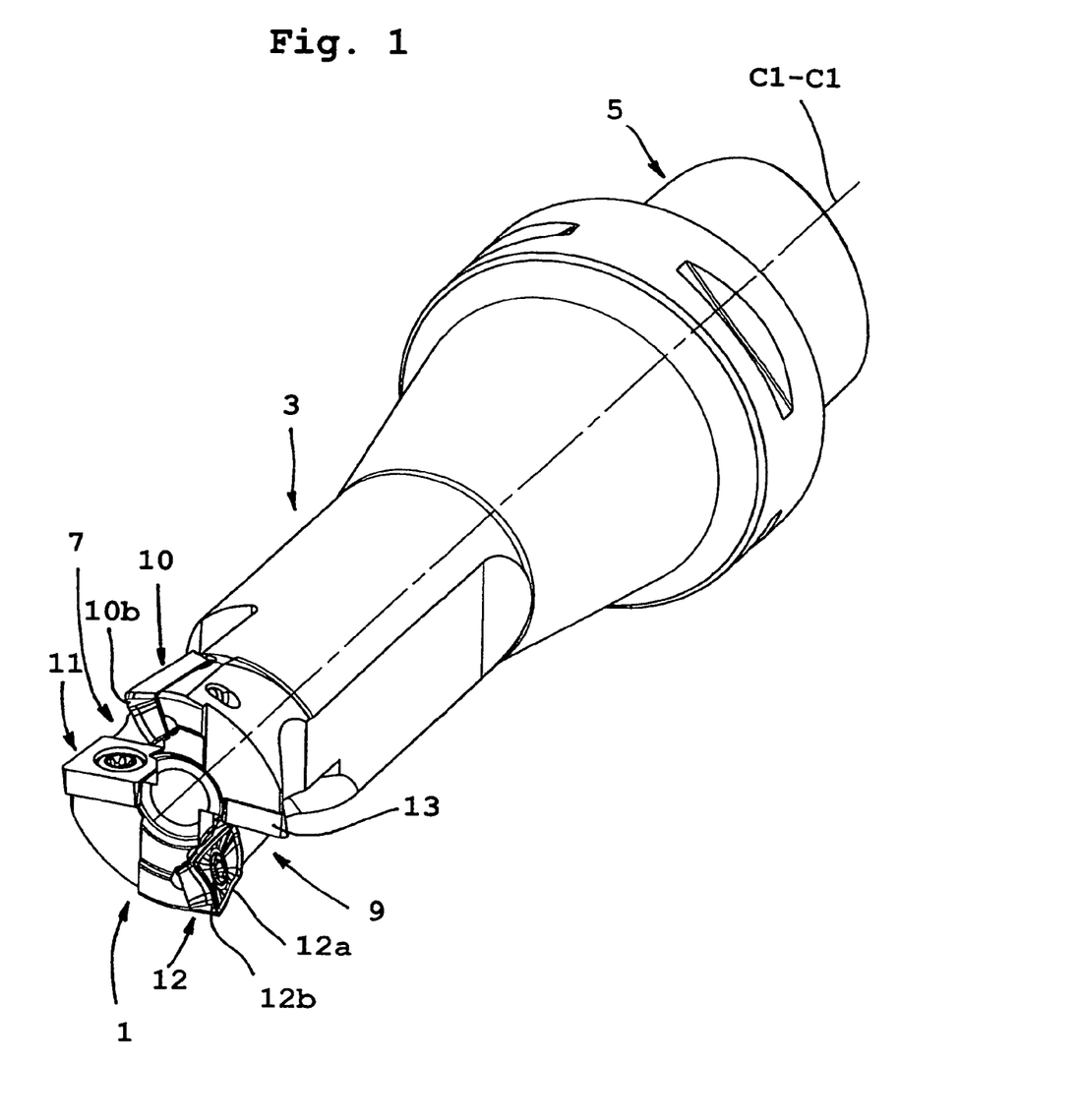
FIG. 1 is a perspective view of a tool according to the present invention.
Figure 2:
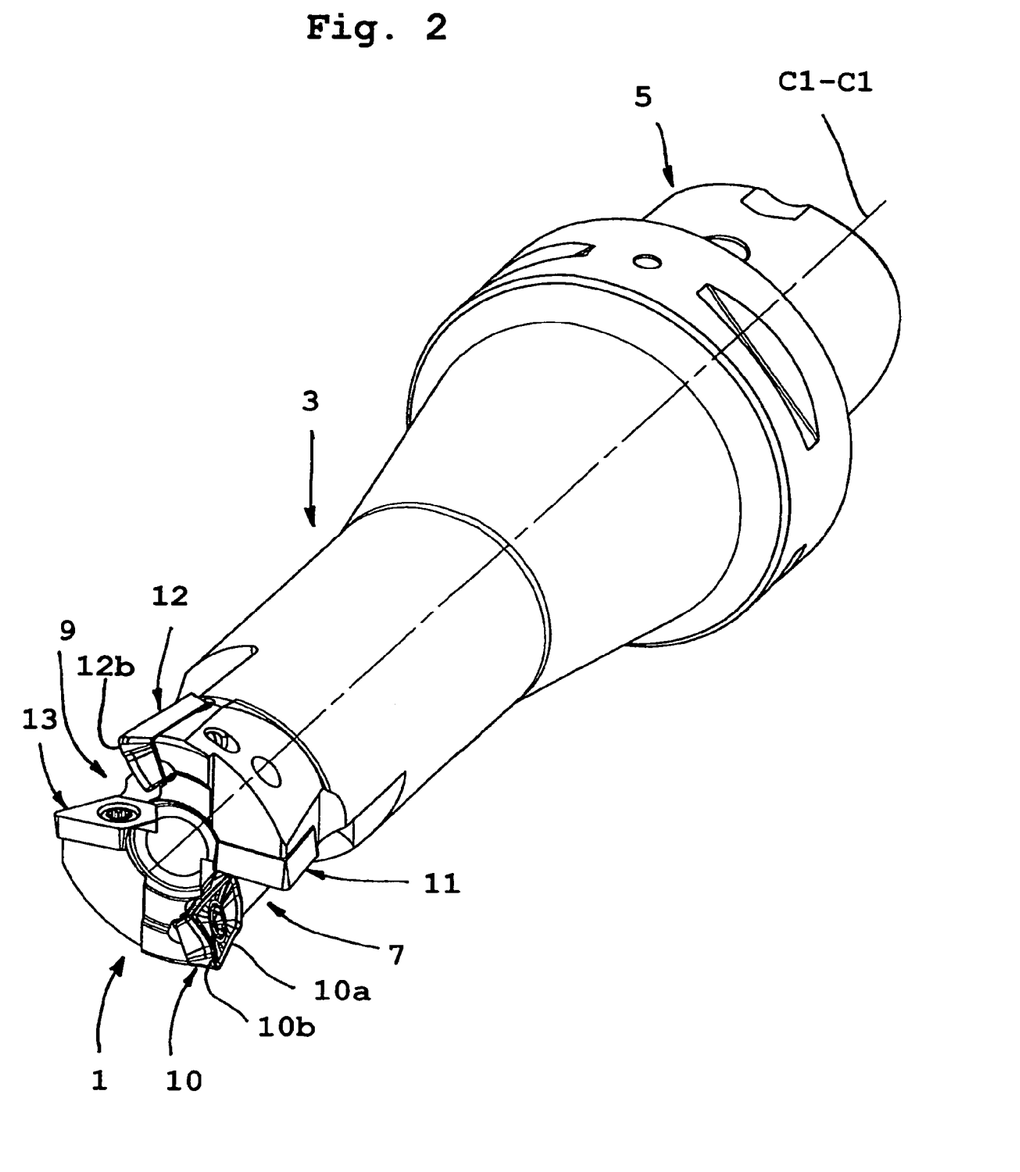
FIG. 2 is an additional perspective view of the tool according to FIG. 1, but showing the tool rotated 180° around the center axis thereof in comparison with the position according to FIG. 1.

The tool shown in FIGS. 1 and 2 comprises a tool head 1, a shaft 3 as well as a fastening part 5, which is intended to be received in a machine tool. At the free end thereof, the fastening part 5 may be provided with a coupling, for instance of the type that is marketed under the trademark COROMANT CAPTO®. A center axis of the tool is designated C1-C1. This axis is also the axis of rotation and defines the axial extension of the tool. The tool head 1 defines a front end of the tool, while the fastening part 5 defines a rear end of the tool.

The tool head 1 of the shown embodiment of the tool comprises two chip pockets 7 and 9, respectively, two cutting inserts for chip removing machining being received in each chip pocket 7, 9. More precisely, each individual insert is mounted in a seat (having no reference numeral) formed in the surfaces confining each pocket, the insert being fixed by means of a screw. In a first chip pocket 7, a first milling insert 10 as well as a first turning insert 11 are mounted. These cutting inserts 10, 11 have their active surfaces opposite each other. In the second chip pocket 9, a second milling insert 12 as well as a second turning insert 13 are accomodated. Also these cutting inserts 12, 13 have their active surfaces opposite each other. For all these cutting inserts 10-13 applies that they, in the embodiment illustrated, are fixed in their respective seats by means of locking screws. Preferably, the milling inserts 10 and 12 are identical and are end mill inserts. The milling inserts 10 and 12 have respective major cutting edges 10a and 12a which are situated in a common, imaginary cylindrical surface having the center axis thereof coinciding with the center axis C1-C1 of the tool. The wiper edges 10b and 12b of the respective milling insert 10 and 12 lie in a common, imaginary plane that is perpendicular to the center axis C1-C1 of the tool.

Figure 3:
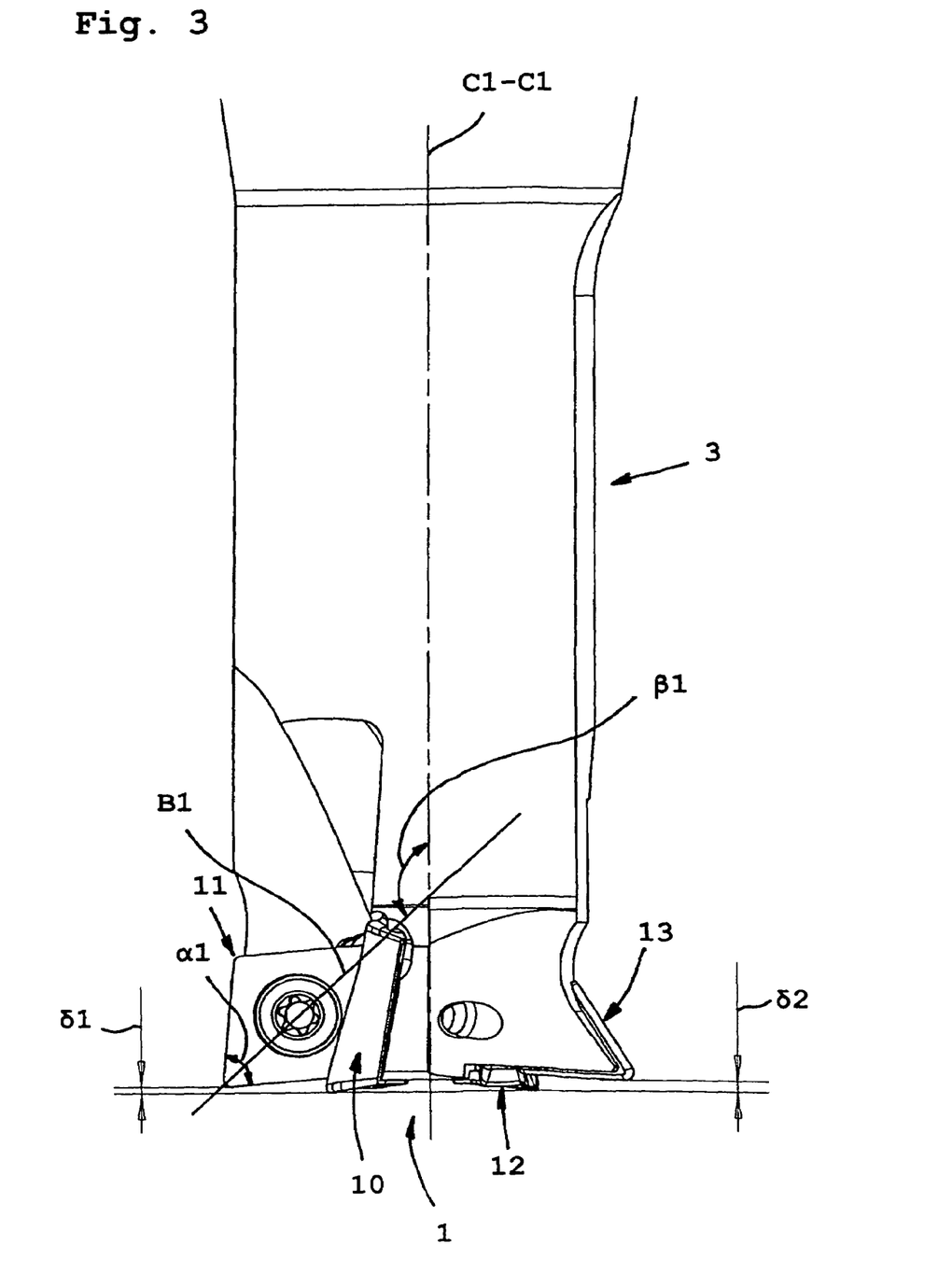
FIG. 3 is a side view of the tool part of the tool according to FIG. 1.

From FIG. 3, it is seen that the portions of the two milling inserts 10 and 12 located furthest forward in the axial direction (C1-C1) are situated on the same axial level and that the portions are situated further forward in the axial direction (C1-C1) of the tool than the portions of the turning inserts 11 and 13 located furthest forward in the axial direction. In this connection, the furthermost portion of the first turning insert 11 is located at a distance $\delta 1$ behind the furthermost portion of the milling inserts 10 and 12, while the furthermost portion of the second turning insert 13 is located at a distance $\delta 2$ behind the furthermost portions of the milling inserts 10 and 12. An important feature of the tool according to the present invention is that to $\delta 1 < \delta 2$. The significance of this relation between $\delta 1$ and $\delta 2$ will be explained more thoroughly below.

Figure 4:
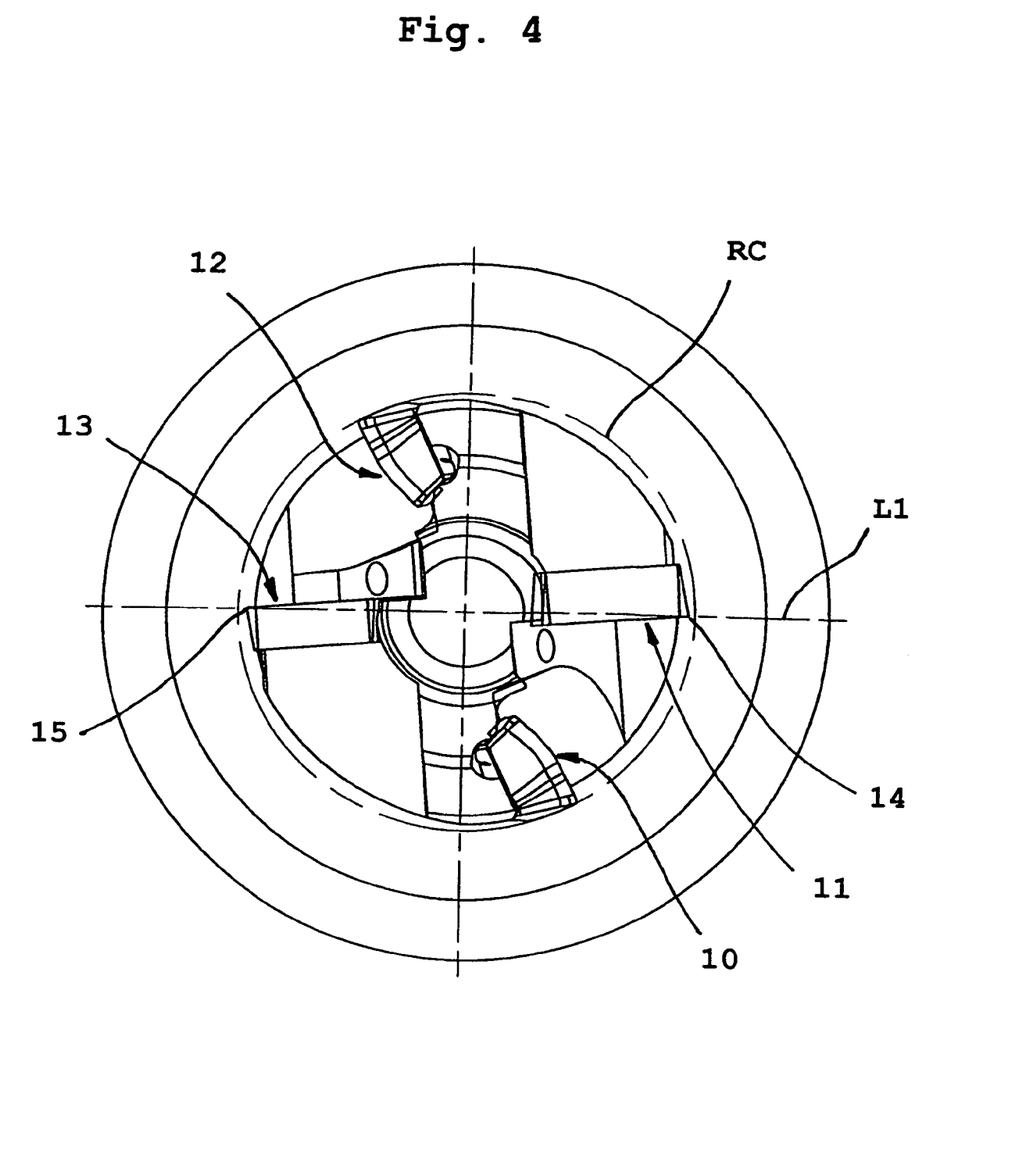
FIG. 4 is an end view of the tool according to FIG. 1.

From the end view shown in FIG. 4, it is seen that the dash-dotted reference circle RC defined by the portions of the milling inserts 10 and 12 located farthest out in the radial direction is situated outside the portions of the turning inserts 11 and 13 located farthest out in the radial direction.

Thus, since the axially furthermost portions of the milling inserts 10, 12 lie axially in front of the axially furthermost portions of the turning inserts 11, 13 1, and since furthermore the radially furthermost portions of the milling inserts 10, 12 lie radially outside the radially furthermost portions of the turning inserts 11, 13, the tool according to the present invention may be used for milling without interference of the turning inserts 11, 13.

From FIG. 4, it is further seen that the cutting tips 14, 15 of the turning inserts 11 and 13, respectively, are located along a line L1 through the center of the tool. This simplifies the programming of the multi-function machines in which the tool is aimed to be used.

Below, a number of working operations that can be carried out by means of the tool will be illustrated. In this connection, the tool machines a workpiece A, which has a center or rotation axis C2-C2. In general, it could be said that, in the shown working operations, the center axis C1-C1 of the tool either forms a right angle with the center axis C2-C2 of the workpiece, or the center axis C1-C1 of the tool is parallel to the center axis C2-C2 of the workpiece.

Figure 5:
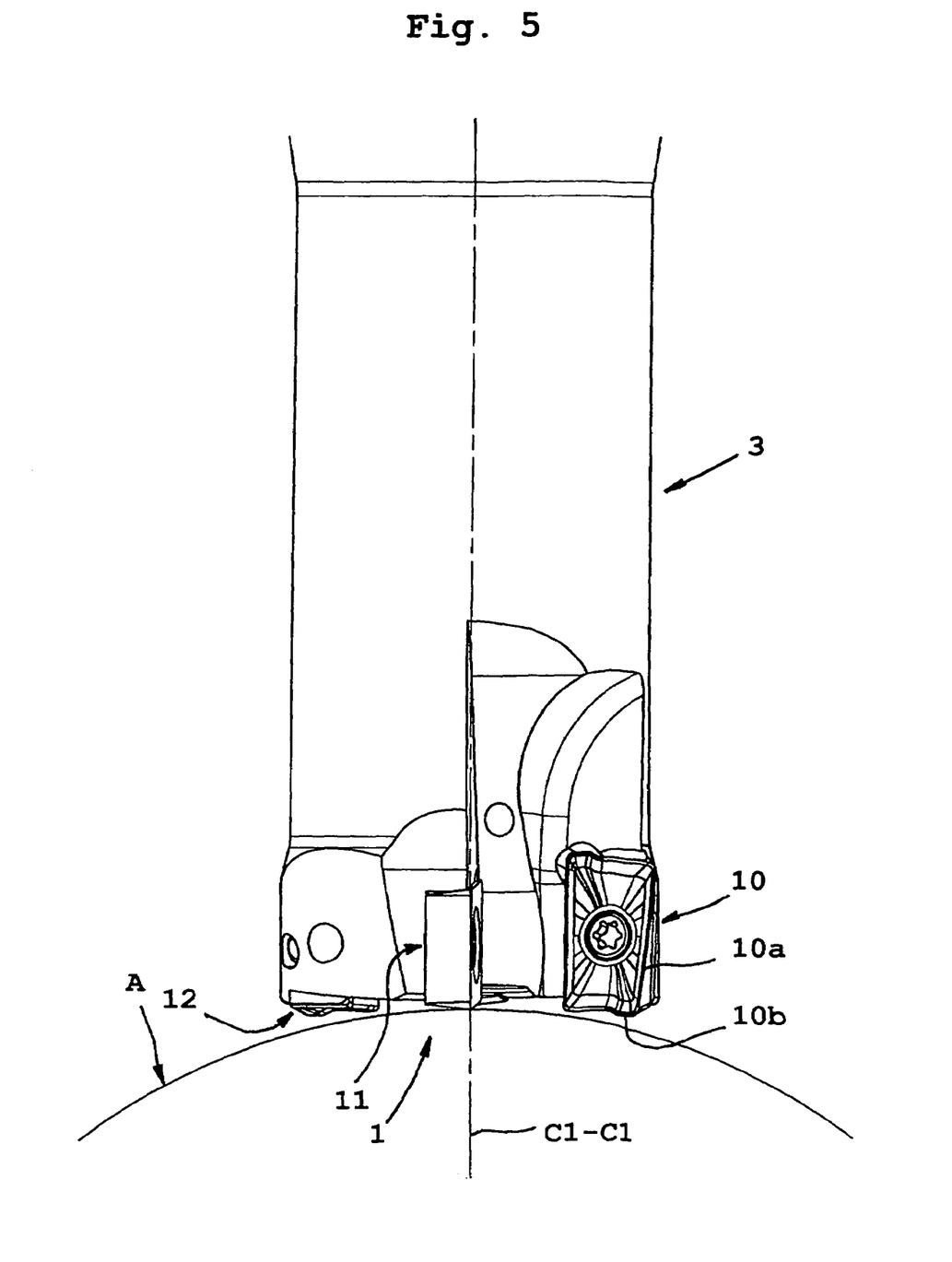
FIG. 5 is a first side view of the tool according to FIG. 1, the tool carrying out turning of a workpiece, the center axis of which has an extension perpendicularly to the paper.
Figure 6:
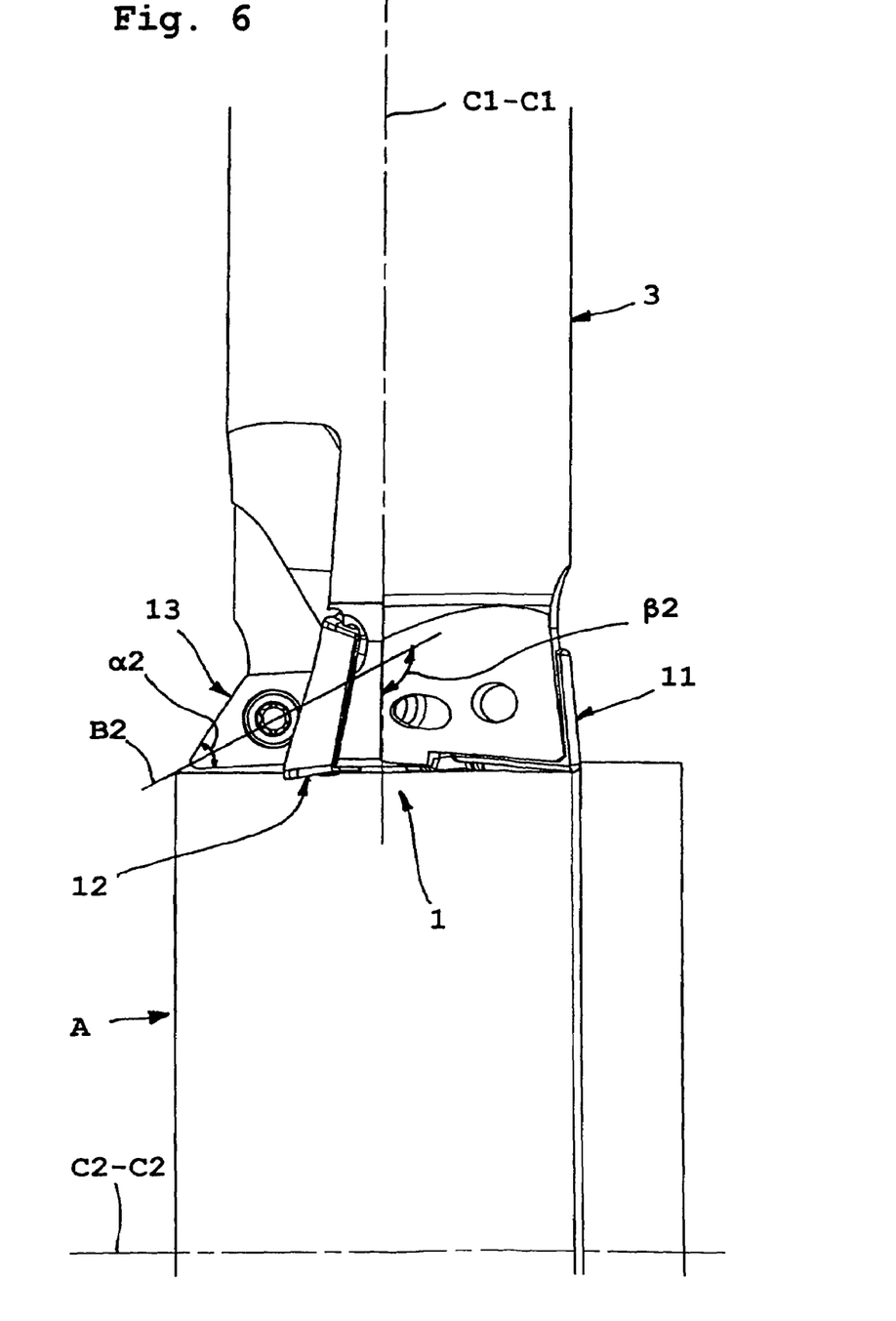
FIG. 6 is a second side view of the tool according to FIG. 1, the tool carrying out turning of the workpiece according to FIG. 5, the center axis of the workpiece extending in the plane of the paper.

The working operation shown in FIGS. 5 and 6 illustrates longitudinal turning of the workpiece A. In spite of the milling inserts 10, 12 being situated axially in front of the turning inserts 11, 13, it is seen from FIG. 5 that the milling inserts 10, 12 do not interfere with the workpiece A in this working operation. The reason therefor is that the external contour of the workpiece A has a certain curvature. From FIG. 6, it is seen that the first turning insert 11 is in engagement with the workpiece A, while the second turning insert 13 is situated axially behind the first turning insert 11, i.e., the second turning insert 13 is situated at a certain distance from the workpiece A. This positioning of the turning inserts 11 and 13 is a result of the fact that $\delta 1 < \delta 2$. For exemplifying, but not limiting purposes, it may be mentioned that $\delta 1$ may be in the interval of 0.2-1.0 mm, preferably 0.3-0.5 mm, while $\delta 2$ may be in the interval of 0.4-2.0 mm, preferably 0.6-1.0 mm. Even if the given intervals partly overlap each other, the relation $\delta 1 < \delta 2$ generally applies. For the working operation shown in FIGS. 5 and 6 applies that C1-C1 is perpendicular to C2-C2.

As for the orientation of the first turning insert 11 in the tool, reference is made to a first bisector B1, see FIG. 3, which traverses the insert tip of the first turning insert 11 and halves the first tip angle $\alpha 1$. The first bisector B1 forms a first obtuse angle $\beta 1$ with the center axis C1-C1 of the tool. For exemplifying, but not limiting purposes, it may be mentioned that if the first tip angle $\alpha 1=80°$, a suitable value of the first obtuse angle is $\beta 1=135°$. The first tip angle $\alpha 1$ is suitably in the interval of $75°<\alpha 1<90°$. When $\alpha 1$ is within the interval of $75°<\alpha 1<90°$, the value of the first obtuse angle $\beta 1$ normally varying $\pm 5°$. The value of the first obtuse angle $\beta 1$ is determined by considerations regarding the clearance of the first turning insert 11 in relation to the workpiece A.

As for the orientation of the second turning insert 13 in the tool, reference is made to a second bisector B2, see FIG. 6, which traverses the insert tip of the second turning insert 13 and halves the second tip angle $\alpha 2$. The second bisector B2 forms a second obtuse angle $\beta 2$ with the center axis C1-C1 of the tool. It may be mentioned that if the second tip angle $\alpha 2=55°$, a suitable value of $\beta 2=120°$. If the second tip angle $\alpha 2=35°$, a suitable value of $\beta 2=110°$. Generally, the equation $2\alpha 2<\beta 2$ should apply. The value of the second obtuse angle $\beta 2$ is above all determined by considerations as for the pressing of the second turning insert 13 against the workpiece A in the turning operation shown in FIG. 8.

Figure 7:
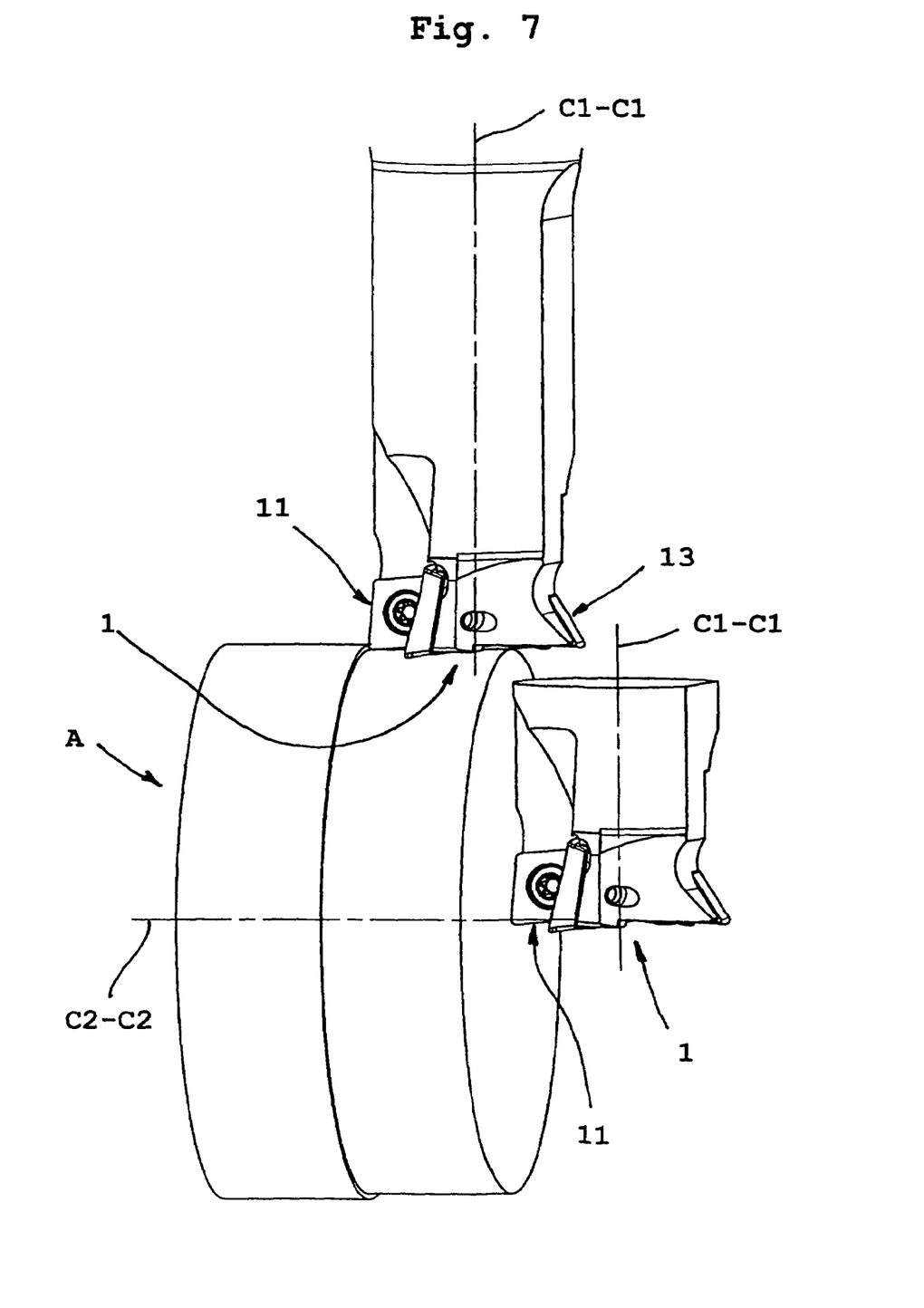
FIG. 7 is a view schematically showing how two turning operations of a workpiece are carried out by the tool according to the invention.

FIG. 7 schematically illustrates two turning operations using the first turning insert 11, which is an insert carrying out so-called roughing. In this context a longitudinal, external turning with the center axis C1-C1 of the tool forming a right angle with the center axis C2-C2 of the workpiece, as well a turning of an end surface of the workpiece A are illustrated, also here the center axis C1-C1 of the tool forming a right angle with the center axis C2-C2 of the workpiece A. Thus, between the turning operations illustrated in FIG. 7, only a parallel displacement of the tool takes place.

Figure 8:
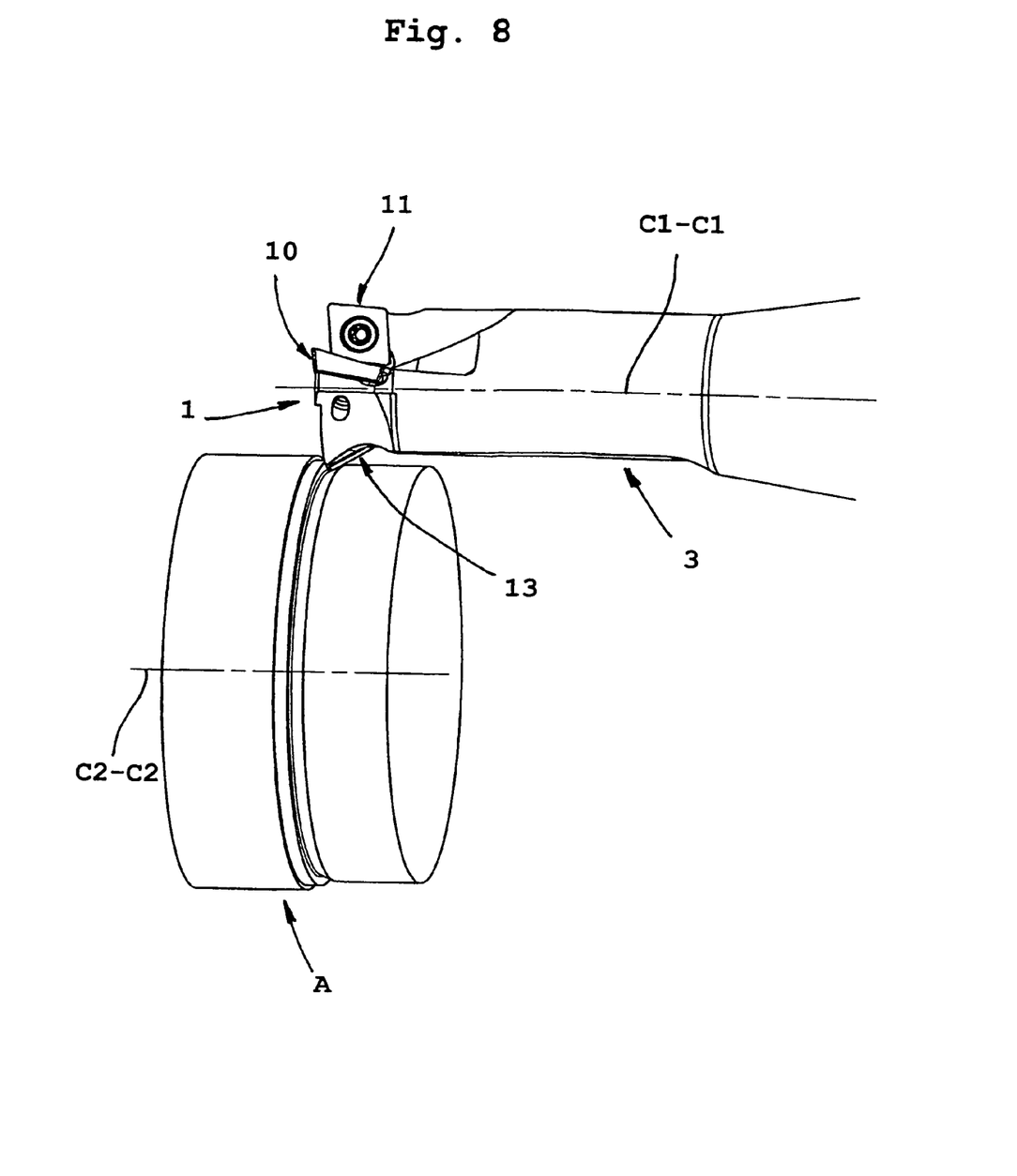
FIG. 8 is a view schematically showing how a turning operation of the workpiece according to FIG. 7 is carried out by the tool.

In FIG. 8, a turning operation using the second turning insert 13, i.e., the cutting insert carrying out so-called finishing, is schematically shown. In this connection, longitudinal, external turning with the center axis C1-C1 of the tool being parallel to the center axis C2-C2 of the workpiece is illustrated.

Figure 9:
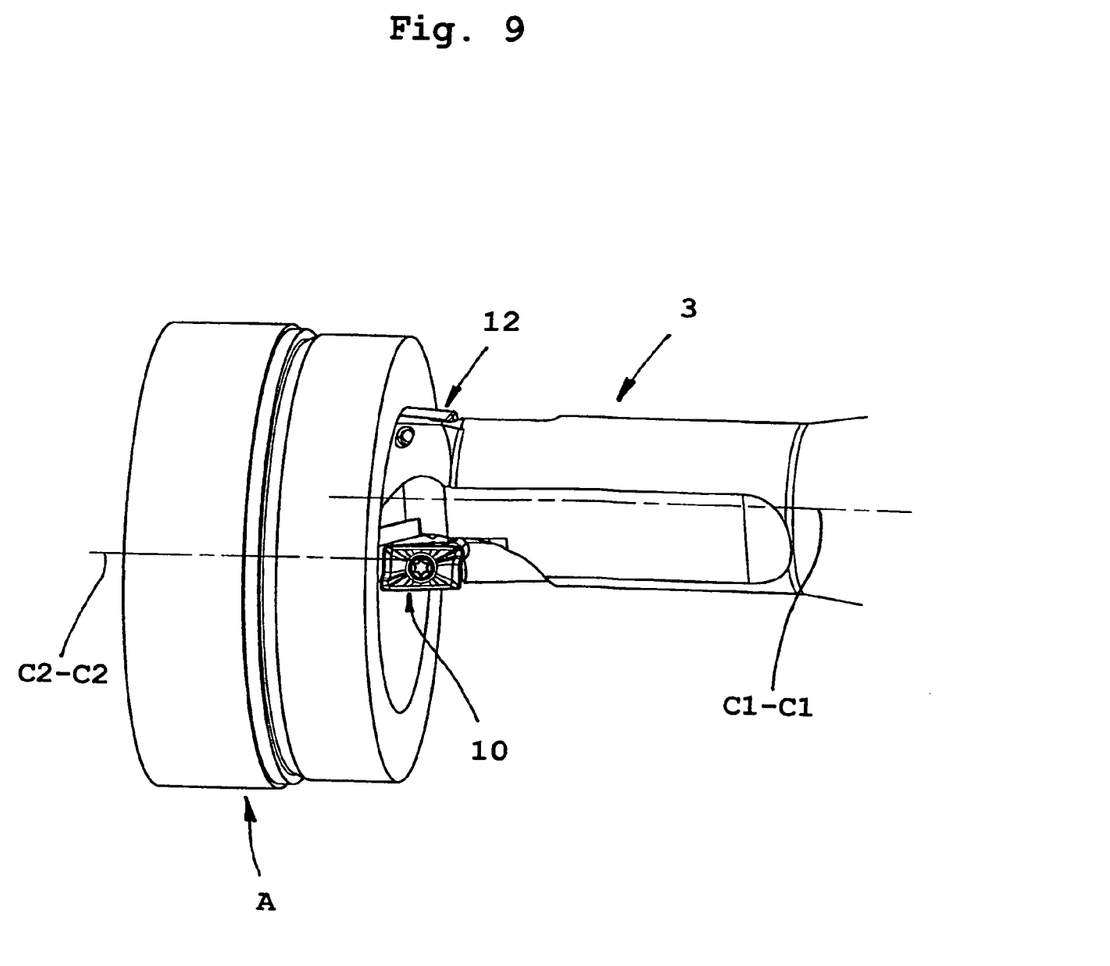
FIG. 9 is a view showing how an internal milling of the workpiece is carried out.

In FIG. 9, it is schematically shown how an axial hole in the workpiece A is provided by means of milling in the form of helical interpolation, the two milling inserts 10 and 12 of the tool carrying out the working operation. Here, the center axis C1-C1 of the tool is parallel to the center axis C2-C2 of the workpiece A.

Figure 10:
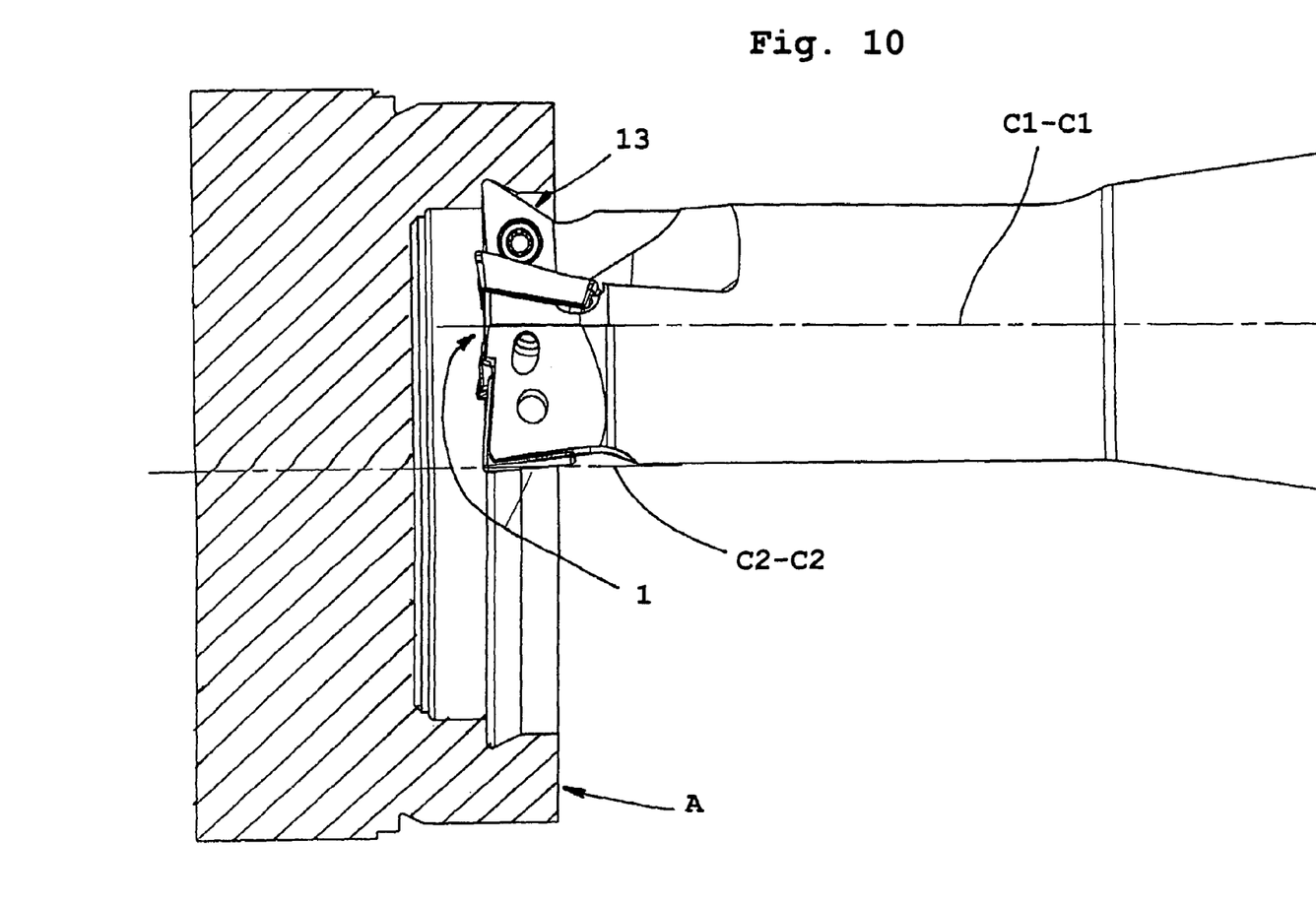
FIG. 10 is a view showing how internal turning of the workpiece is carried out.

In FIG. 10, internal turning of the hole milled in FIG. 9 is schematically shown. This internal turning is carried out using the second turning insert 13, which is an insert performing so-called finishing. Here, the center axis C1-C1 of the tool is parallel to the center axis C2-C2 of the workpiece A.

Figure 11:
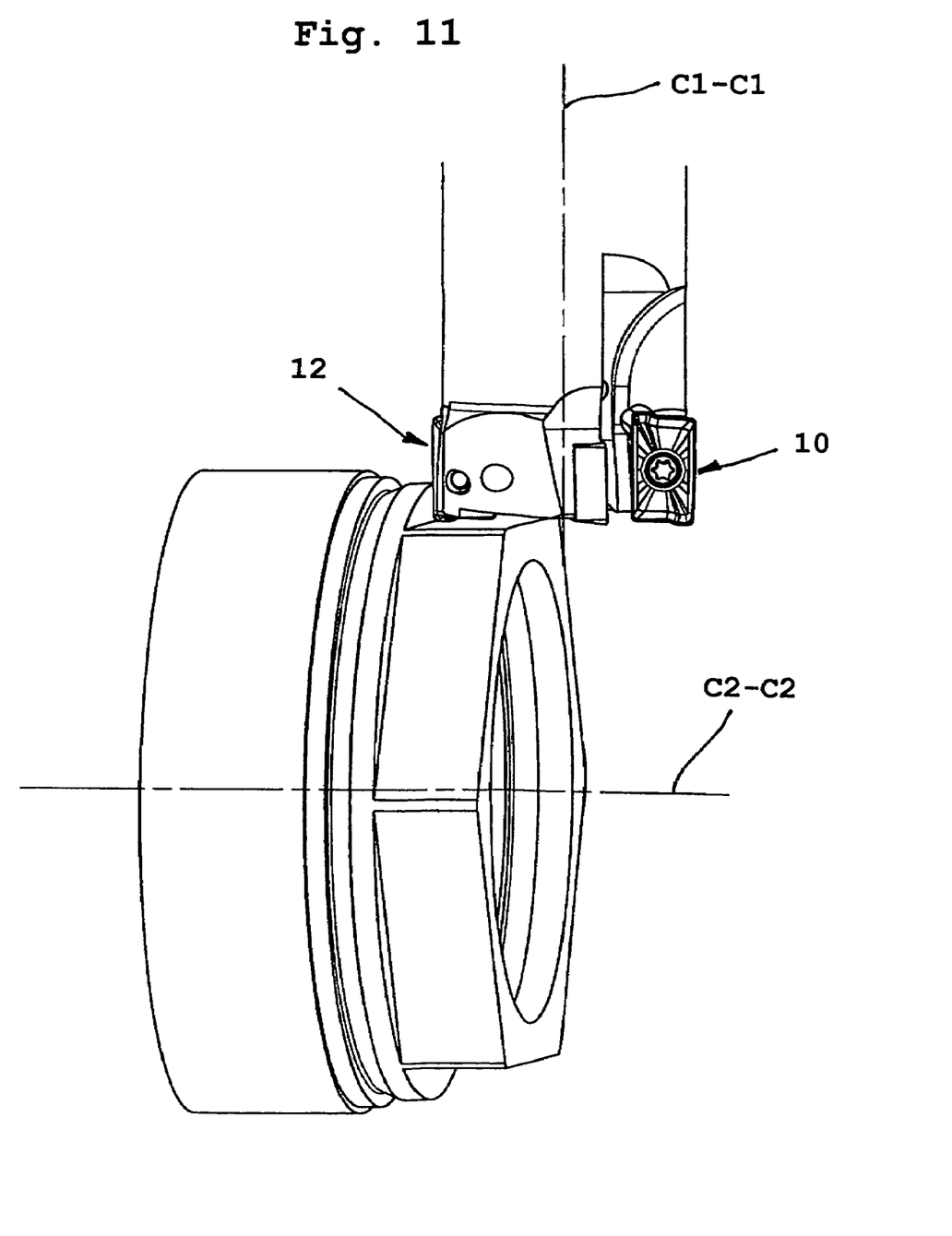
FIG. 11 is a view showing how an external milling of the workpiece is carried out.
Figure 12:
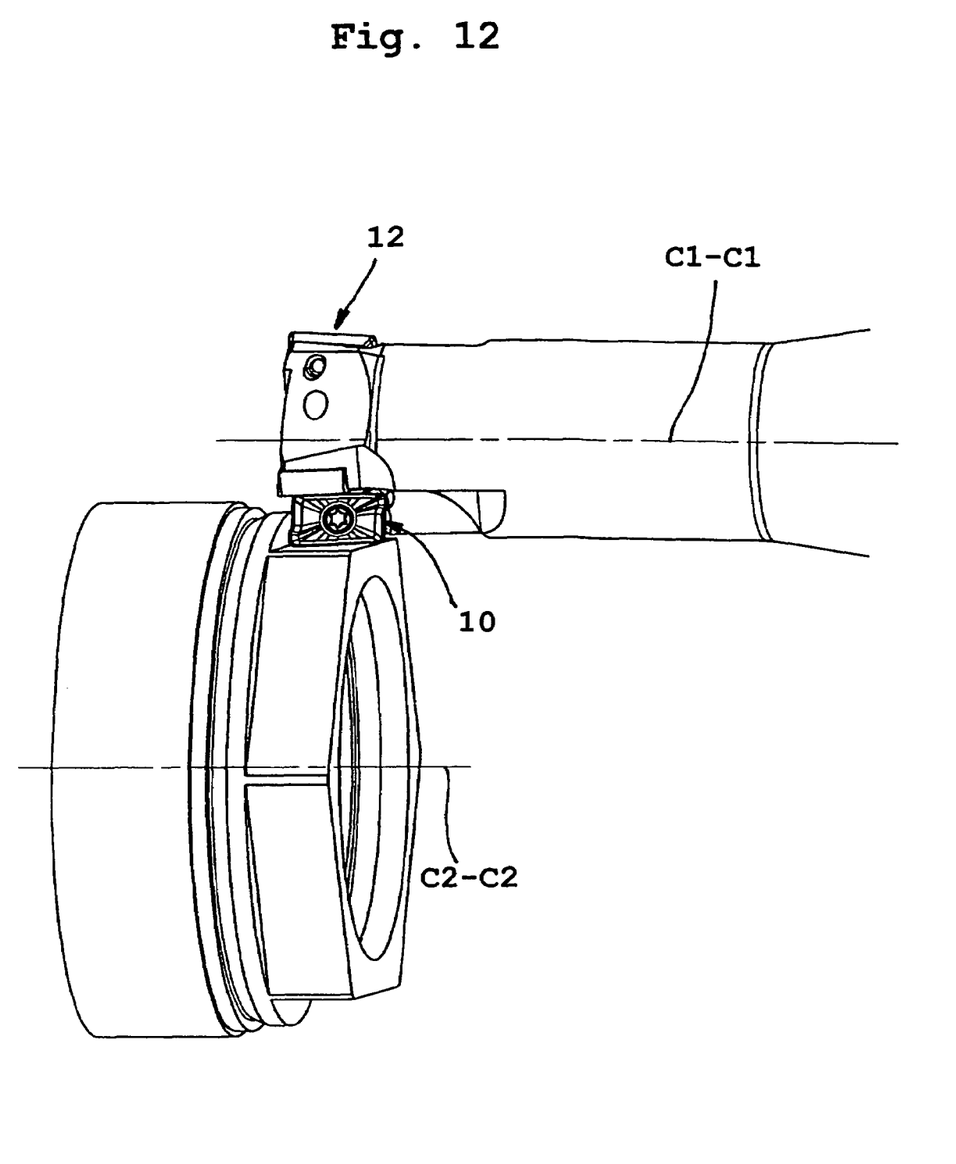
FIG. 12 is a view showing how an external milling of the workpiece is carried out, the tool assuming another position than the one shown in FIG. 11.

FIGS. 11 and 12 schematically show how a planar surface of the workpiece A can be produced by two different milling operations by means of the tool. In FIG. 11, the center axis C1-C1 of the tool is oriented perpendicularly to the center axis C2-C2 of the workpiece A, while in FIG. 12 the center axis C1-C1 of the tool is parallel to the center axis C2-C2 of the workpiece A.

In the embodiment of the present invention described above, the tool is provided with a certain set of cutting inserts for chip removing machining. As for the turning inserts in particular, these inserts may be of another type than the ones described above. Such turning inserts should, however, be intended for different kinds of machining for the relation δ1<δ2 to be of relevance.

In the embodiment described above, it has been stated that the cutting inserts are fixed in their seats by means of locking screws. Within the scope of the present invention it is, however, also conceivable to fix the cutting inserts in alternative ways, e.g. by means of a top clamp or the like.

In the working operations shown above and carried out by means of the tool according to the present invention, the center axis C1-C1 of the tool assumes a position being either perpendicular to or parallel to the center axis C2-C2 of the workpiece A. This is the preferred way to use the tool, but it should be pointed out that the tool can also be used when the center axis C1-C1 of the tool forms, for instance, an acute angle with the center axis C2-C2 of the workpiece A.

What is claimed is:

1. A tool for chip removing machining, comprising:
   a tool head including insert seats for receipt of replaceable cutting inserts;
   a fastening part to be received in a machine tool,
   at least two chip pockets, each of said chip pockets including cutting inserts intended for different types of machining and having active surfaces thereof opposite each other, each of said chip pockets including a cutting insert for turning and a cutting insert for milling;
   wherein said cutting inserts arranged in a common chip pocket have axially furthermost portions located at different levels in an axial direction of the tool and said cutting inserts for turning being located in different chip pockets, said cutting inserts for turning having axially furthermost portions located at different levels from each other in the axial direction of the tool, said levels being measured from an imaginary line drawn at a furthermost portion of the milling insert and being perpendicular to the axial direction of the tool.

2. The tool according to claim 1, wherein a furthermost portion of a turning insert intended for roughing is located further forward in the axial direction than the furthermost portion of the turning insert intended for finishing.

3. The tool according to claim 2, wherein a position difference between the turning inserts in the axial direction of the tool is in the interval of 0.2-1.0 mm.

4. The tool according to claim 1, wherein tips of the turning inserts are located along a line intersecting a center axis of the tool.

5. The tool according to claim 1, wherein a bisector (β2) of a tip angle (α2) of the turning insert for finishing forms an obtuse angle with a center axis of the tool.

6. The tool according to claim 5, wherein 2(α2)<β2 applies for a relation between the tip angle (α2) and the obtuse angle (β2).

7. The tool according to claim 2, wherein a bisector (β2) of a tip angle (α2) of the turning insert for roughing forms an obtuse angle (β2) with the center axis of the tool.

8. A tool for chip removing machining, comprising:
   a tool head including insert seats for receipt of replaceable cutting inserts;
   a fastening part to be received in a machine tool;
   at least two chip pockets, each of said chip pockets including at least two cutting inserts intended for different types of machining and having active surfaces thereof opposite each other;
   wherein said cutting inserts arranged in a common chip pocket have axially furthermost portions located at different levels from each other in an axial direction of the tool, said levels being measured from an imaginary line drawn at a furthermost portion of the milling insert and being perpendicular to the axial direction of the tool, each of said chip pockets including a cutting insert for turning and having axially furthermost portions located at different levels in the axial direction of the tool.

9. The tool according to claim 8, wherein one of the cutting inserts for turning is for roughing and the other one of the cutting inserts for turning is for finishing, and wherein the turning insert for roughing is located further forward in the axial direction than the furthermost portion of the turning insert for finishing.

10. The tool according to claim 9, wherein a position difference between the turning inserts in the axial direction of the tool is in the interval of 0.2-1.0 mm.

11. The tool according to claim 8, wherein tips of the turning inserts are located along a line intersecting a center axis of the tool.

12. The tool according to claim 8, wherein a bisector (β2) of a tip angle (α2) of the turning insert for finishing forms an obtuse angle with a center axis of the tool.

13. The tool according to claim 12, wherein 2(α2)<β2 applies for a relation between the tip angle (α2) and the obtuse angle (β2).

14. The tool according to claim 9, wherein a bisector (β2) of a tip angle (α2) of the turning insert for roughing forms an obtuse angle (β2) with the center axis of the tool.

* * * * *